(12) United States Patent
Shinozaki

(10) Patent No.: US 10,897,510 B2
(45) Date of Patent: Jan. 19, 2021

(54) SERVICE PROVIDING DEVICE AND SERVICE PROVIDING SYSTEM

(71) Applicant: TOYOTA JIDOSHA KABUSHIKI KAISHA, Toyota (JP)

(72) Inventor: Takayoshi Shinozaki, Sakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 15/937,384

(22) Filed: Mar. 27, 2018

(65) Prior Publication Data

US 2018/0288172 A1 Oct. 4, 2018

(30) Foreign Application Priority Data

Apr. 4, 2017 (JP) .................................. 2017-074827

(51) Int. Cl.
*H04L 29/08* (2006.01)
*H04W 12/06* (2009.01)
(Continued)

(52) U.S. Cl.
CPC .......... *H04L 67/18* (2013.01); *H04L 63/0892* (2013.01); *H04L 67/12* (2013.01);
(Continued)

(58) Field of Classification Search
CPC .... G01C 21/3679; G01C 21/26; G01C 21/34; G07C 5/00; G06F 3/0484; H04W 4/024;
(Continued)

(56) References Cited

U.S. PATENT DOCUMENTS

| | | | |
|---|---|---|---|
| 8,751,162 B1* | 6/2014 | Barbeau | G01C 21/20 |
| | | | 701/524 |
| 2003/0009271 A1* | 1/2003 | Akiyama | H04L 67/12 |
| | | | 701/29.6 |

(Continued)

FOREIGN PATENT DOCUMENTS

| | | |
|---|---|---|
| CN | 106330445 A | 1/2017 |
| JP | 2000172645 A | 6/2000 |

(Continued)

*Primary Examiner* — Christopher B Robinson
(74) *Attorney, Agent, or Firm* — Hunton Andrews Kurth LLP

(57) ABSTRACT

A service providing device includes a storage unit configured to store driver management information including at least driver identification information, a reception unit configured to receive the driver identification information from the in-vehicle device, a determination unit configured to determine whether the driver management information including the driver identification information received by the reception unit is stored in the storage unit, an acquisition unit configured to acquire the driver management information from one or more other service providing devices connected to the service providing device over a network the determination unit determines that the driver management information is not stored in the storage unit, an authentication unit configured to authenticate the in-vehicle device based on the acquired driver management information, and a providing unit configured to provide the service to the in-vehicle device when the authentication has been successful.

8 Claims, 7 Drawing Sheets

(51) Int. Cl.
*H04W 4/80* (2018.01)
*H04W 4/024* (2018.01)
*H04W 4/02* (2018.01)
*H04L 29/06* (2006.01)
*H04W 12/00* (2009.01)
*H04W 4/44* (2018.01)

(52) U.S. Cl.
CPC ........... *H04W 4/023* (2013.01); *H04W 4/024* (2018.02); *H04W 12/00503* (2019.01); *H04W 12/0602* (2019.01); *H04W 4/44* (2018.02); *H04W 4/80* (2018.02)

(58) Field of Classification Search
CPC . H04W 12/06; H04W 4/023; H04W 12/0602; H04W 12/00503; H04W 4/80; H04L 67/18; H04L 67/12; H04L 63/0892
See application file for complete search history.

(56) References Cited

U.S. PATENT DOCUMENTS

| | | | |
|---|---|---|---|
| 2006/0082437 A1* | 4/2006 | Yuhara | B60R 25/04 340/5.82 |
| 2008/0004791 A1* | 1/2008 | Sera | G08G 1/096827 701/117 |
| 2015/0133164 A1* | 5/2015 | Song | H04W 4/046 455/456.3 |
| 2017/0048672 A1* | 2/2017 | Herz | G06Q 30/02 |
| 2017/0082447 A1* | 3/2017 | Ricci | A61B 5/7405 |
| 2017/0277878 A1* | 9/2017 | Osotkraphun | G06F 21/30 |

FOREIGN PATENT DOCUMENTS

| | | |
|---|---|---|
| JP | 2007-166123 A | 6/2007 |
| JP | 2012215922 A | 11/2012 |
| JP | 2016-133868 A | 7/2016 |

* cited by examiner

FIG. 6

| USER ID | PASSWORD | MOVEMENT HISTORY | UPDATE DATE AND TIME | ... |
|---------|----------|------------------|----------------------|-----|
| user001 | ****** | server1 | DATE AND TIME 1 | ... |
| user002 | ****** | server1 | DATE AND TIME 2 | ... |
|         |          | server2 | DATE AND TIME 3 | ... |
| ... | ... | ... | ... | ... |

18 } USER MANAGEMENT INFORMATION

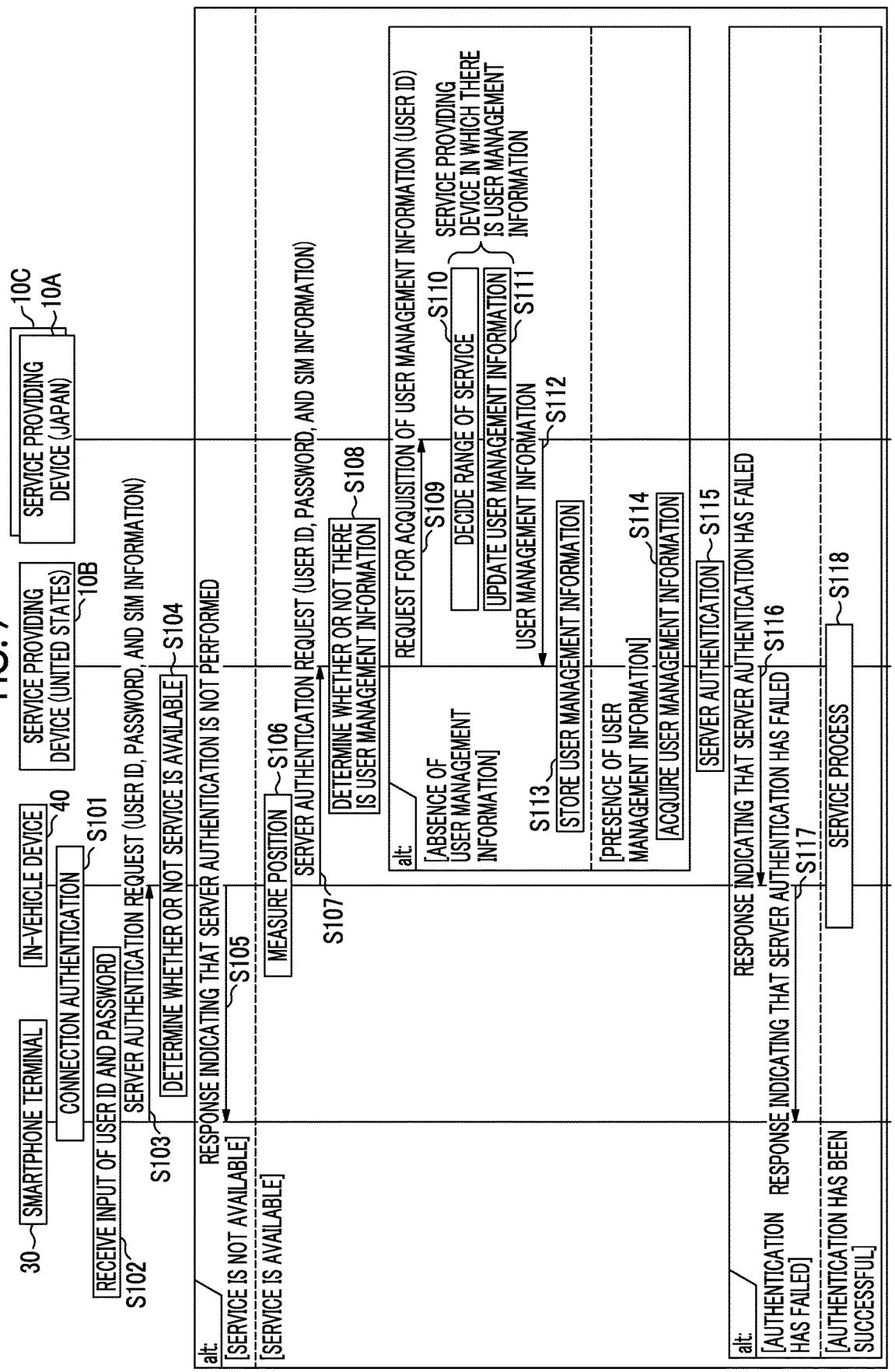

SERVICE PROVIDING DEVICE AND SERVICE PROVIDING SYSTEM

INCORPORATION BY REFERENCE

The disclosure of Japanese Patent Application No. 2017-074827 filed on Apr. 4, 2017 including the specification, drawings and abstract is incorporated herein by reference in its entirety.

BACKGROUND

1. Technical Field

The present disclosure relates to a service providing device and a service providing system.

2. Description of Related Art

A service for providing information such as traffic jam information, weather, and places of restaurants according to a region at which a vehicle is traveling in conjunction with a location (for example, a country or a region), traveling information, or the like of the vehicle has been known. The service as described above is provided, for example, by transmitting driver identification information for identifying a driver to a server device.

A technology for performing driving assistance according to a driver of a vehicle using driver information acquired by transmitting driver identification information for identifying the driver of the vehicle to a server device has been known as the related art (for example, see Japanese Unexamined Patent Application Publication No. 2016-133868 (JP 2016-133868 A)).

SUMMARY

Here, when driver identification information (user ID) is transmitted to a different server device according to a location of a vehicle, the driver may not be able to receive an appropriate service.

For example, it is assumed that when a vehicle is in Japan, a management file including a password and the like needed for a driver to use the service is stored in a server device to which a user ID is transmitted, and when the vehicle is in the United States, the management file is not stored in the server device to which the user ID is transmitted. In this case, the driver cannot receive the service in the United States using the user ID.

Thus, it is conceivable that the driver acquires a user ID, for example, for each location, but this is inconvenient since it is needed to use the user ID according to the location of the vehicle. It is conceivable that all server devices store the same management file, but in this case, the amount of data increases, and thus, many storage devices are needed. For example, it is conceivable that a service in the United States and a service in Japan are provided by one server device set in Japan, but in this case, when the service is used in the United States, a communication cost increases or communication delay occurs.

Therefore, the present disclosure provides a service using the same driver identification information between different locations.

A first aspect of the disclosure relates to a service providing device configured to provide a service according to a position of a vehicle in cooperation with an in-vehicle device mounted on the vehicle. The service providing device includes a storage unit, a reception unit, a determination unit, an acquisition unit, an authentication unit, and a providing unit. The storage unit is configured to store driver management information including at least driver identification information for identifying a driver. The reception unit is configured to receive driver identification information of the driver of the vehicle from the in-vehicle device. The determination unit is configured to determine whether or not the driver management information including the driver identification information received by the reception unit is stored in the storage unit. The acquisition unit is configured to acquire the driver management information from one or more other service providing devices connected to the service providing device over a network when the determination unit determines that the driver management information is not stored in the storage unit. The authentication unit is configured to authenticate the in-vehicle device based on the driver management information acquired by the acquisition unit. The providing unit is configured to provide the service to the in-vehicle device when the authentication by the authentication unit has been successful.

As described above, when the driver management information of the driver of the vehicle is not stored in the storage unit, the service providing device according to the first aspect of the present disclosure acquires the driver management information from another service providing device. Therefore, the driver can use the service using the same driver identification information between different locations.

In the service providing device according to the first aspect of the present disclosure, the reception unit may be configured to receive driver identification information input by a terminal connected to the in-vehicle device through short-range wireless communication or driver identification information input in the in-vehicle device from the in-vehicle device.

As described above, in the first aspect of the present disclosure, the driver identification information input by the driver in the terminal connected to the in-vehicle device mounted on the vehicle through short-range wireless communication or the in-vehicle device is received.

In the service providing device according to the first aspect of the present disclosure, the storage unit may be configured to store driver management information including at least driver identification information for identifying the driver and authentication information corresponding to the driver identification information. The reception unit may be configured to receive authentication information input by the terminal or authentication information input in the in-vehicle device from the in-vehicle device. The authentication unit may be configured to authenticate the in-vehicle device based on the authentication information included in the driver management information acquired by the acquisition unit and the authentication information received by the reception unit.

As described above, in the first aspect of the present disclosure, the authentication is performed based on the authentication information input by the driver in the terminal connected to the in-vehicle device mounted on the vehicle through short-range wireless communication or the in-vehicle device, and the authentication information included in the driver management information. As described above, the driver can input the driver identification information in any of the terminal, such as a smartphone, and the in-vehicle device.

In the service providing device according to the first aspect of the present disclosure, the storage unit may be configured to further store the driver management information including an acquisition history in which the driver management information has been obtained from another service providing device by the acquisition unit. The service providing device may further include a deciding unit configured to decide a range of a service to be provided to the in-vehicle device from the acquisition history included in the driver management information acquired by the acquisition unit. The providing unit may be configured to provide the service in the range decided by the deciding unit.

As described above, in the first aspect of the present disclosure, the range of the service to be provided to the driver is decided from the history included in the driver management information corresponding to the driver identification information of the driver.

A second aspect of the disclosure relates to a service providing system including an in-vehicle device that is mounted on a vehicle, and a plurality of service providing devices configured to provide a service according to a position of the vehicle in cooperation with the in-vehicle device. The in-vehicle device is configured to receive an input of driver identification information for identifying a driver of the vehicle, measure the position of the vehicle, and transmit the driver identification information of which the input has been received to the service providing device according to the measured position of the vehicle among the service providing devices. The service providing devices is configured to store driver management information including at least driver identification information for identifying the driver, receive the driver identification information of the driver of the vehicle from the in-vehicle device, determine whether or not the driver management information including the received driver identification information is stored, acquire the driver management information from one or more other service providing devices different from the service providing device among the service providing devices when a determination is made that the driver management information is not stored, authenticate the in-vehicle device based on the acquired driver management information, and provide the service to the in-vehicle device when the authentication has been successful.

As described above, in the service providing device according to the second aspect of the present disclosure, when the driver management information of the driver of the vehicle is not stored in the storage unit, the service providing device acquires the driver management information from another service providing device. Therefore, the driver can use the service using the same driver identification information between different locations.

In the service providing system according to the second aspect of the present disclosure, the in-vehicle device may be configured to perform short-range wireless communication with a terminal, and transmit the input driver identification information for identifying the driver of the vehicle or driver identification information received from the terminal to the service providing device.

In the service providing system according to the second aspect of the present disclosure, the service providing device may be configured to store driver management information including at least driver identification information for identifying the driver and authentication information corresponding to the driver identification information, receive authentication information input by the terminal or authentication information input in the in-vehicle device from the in-vehicle device, and authenticate the in-vehicle device based on the authentication information included in the acquired driver management information and the authentication information received from the in-vehicle device.

In the service providing system according to the second aspect of the present disclosure, the service providing device may be configured to further store the driver management information including an acquisition history in which the driver management information has been acquired from another service providing device, decide a range of a service to be provided to the in-vehicle device from the acquisition history included in the acquired driver management information, and provide the service in the decided range.

It is possible to provide a service using the same driver identification information even between different locations.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a diagram illustrating an example of a user management information storage unit; and FIG. 7 is a sequence diagram illustrating an example of an overall process for using a service.

DETAILED DESCRIPTION OF EMBODIMENTS

Hereinafter, embodiments of the present disclosure will be described with reference to the drawings.

Overall Configuration

Figure 1:
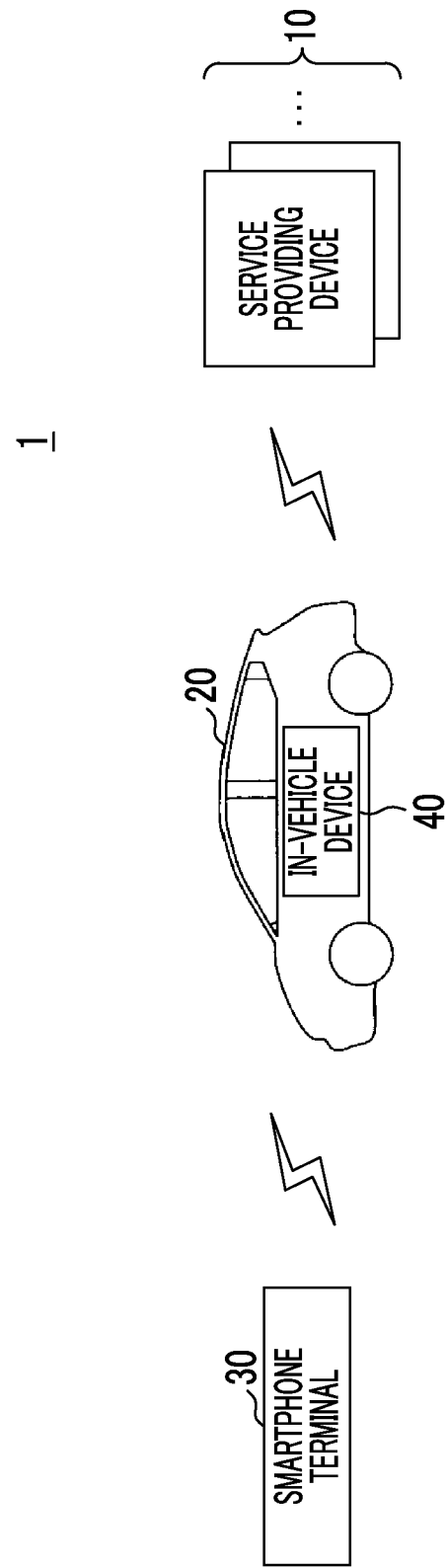
FIG. 1 is a diagram illustrating an example of an overall configuration of a service providing system according to an embodiment.

An overall configuration of a service providing system 1 according to the embodiment will be described with reference to FIG. 1. FIG. 1 is a diagram illustrating an example of the overall configuration of the service providing system 1 according to this embodiment.

As illustrated in FIG. 1, the service providing system 1 according to the embodiment includes a plurality of service providing devices 10, a smartphone terminal 30, and an in-vehicle device 40 mounted on a vehicle 20. The service providing devices 10 and the in-vehicle device 40 are communicatably connected over a communication line network using a communication standard such as long term evolution (LTE). The smartphone terminal 30 and the in-vehicle device 40 are communicatably connected through short-range wireless communication such as Bluetooth (registered trademark).

The service providing device 10 is one or more computers that are installed at respective locations, and cooperates with the in-vehicle device 40 to provide a service according to the location of the vehicle 20. The location may include a country, a region, and the like. A driver (user) of the vehicle 20 traveling within a certain location can use the service that is provided by the service providing device 10 corresponding to the location.

For example, the user of the vehicle 20 traveling within the United States can use the service that is provided by the service providing device 10 corresponding to the United States (for example, a service for providing traffic jam information in the United States). Similarly, for example, the user of the vehicle 20 traveling within Japan can use the service that is provided by the service providing device 10 corresponding to Japan (for example, a service for providing traffic jam information within Japan).

Here, the service that is provided by the service providing device 10 is not limited to a service for assisting driving of the vehicle 20 (for example, a service for providing traffic information, a car navigation service, or a service for issuing a warning when the amount of remaining gasoline is less than a threshold value). The service that is provided by the service providing device 10 includes various services such as a service for providing information on a location or the like of a restaurant, a news service, and a radio service. The service is provided, for example, by an application program installed in the in-vehicle device 40 displaying information that is transmitted by the service providing device 10.

The service providing device 10 can provide the service according to the location of the vehicle 20 by receiving, for example, a user ID needed for the user of the vehicle 20 to use the service from the in-vehicle device 40 and performing, for example, authentication of the user ID. In this case, when the service providing device 10 does not hold information (user management information 1000 to be described below) that is used for, for example, authentication of the user ID, the service providing device 10 acquires the information from another service providing device 10. As described above, the user can use the service at different locations using the same user ID. The user ID is an example of the driver identification information for identifying the driver of the vehicle 20.

The smartphone terminal 30 is a computer such as a smartphone that is used by a user. However, the present disclosure is not limited to the smartphone, and may be, for example, a tablet terminal. By inputting a user ID and a password using the smartphone terminal 30, the user can use the service that is provided by the service providing device 10. The user ID and the password input to the smartphone terminal 30 are transmitted to the in-vehicle device 40 via short-range wireless communication.

The in-vehicle device 40 is a computer that is mounted on the vehicle 20 of the user. The in-vehicle device 40 transmits the user ID and the like received from the smartphone terminal 30 to the service providing device 10 using LTE or the like. In this case, the in-vehicle device 40 transmits the user ID and the like to the service providing device 10 according to the position of the vehicle 20. As described above, a service according to the position of the vehicle 20 (that is, the location of the vehicle 20) is provided to the user.

A configuration of the service providing system 1 illustrated in FIG. 1 is merely an example, and other configurations may be adopted. For example, the service providing system 1 may not include the smartphone terminal 30. In this case, the user may input the user ID and the like to use the service to the in-vehicle device 40.

Hereinafter, when the service providing devices 10 are distinguished and indicated, the service providing devices are referred to as a "service providing device 10A", a "service providing device 10B", a "service providing device 10C", and the like. The service providing device 10A is installed within Japan and provides services to vehicles 20 within Japan. The service providing device 10B is installed within the United States and provides services to vehicles 20 within the United States.

When a plurality of vehicles 20 is distinguished and indicated, the vehicles are referred to as a "vehicle 20A", a "vehicle 20B", a "vehicle 20C", and the like. The same applies to the smartphone terminals 30 and the in-vehicle devices 40.

Hardware Configuration

Service Providing Device 10 and Smartphone Terminal 30

Figure 2:
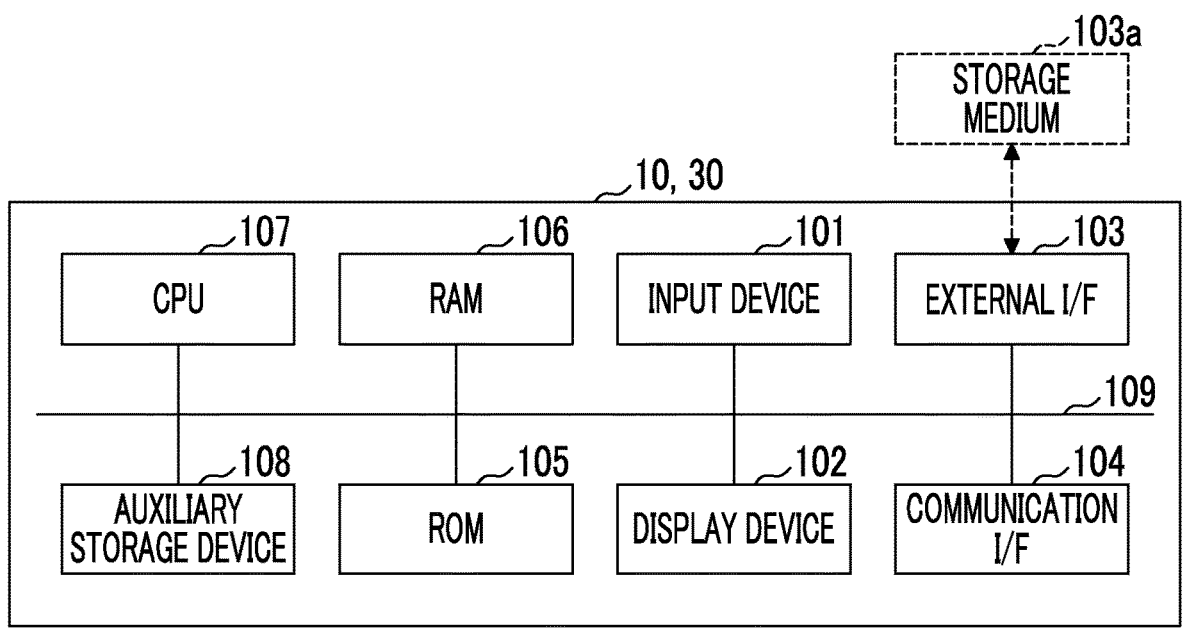
FIG. 2 is a diagram illustrating an example of a hardware configuration of a service providing device and a smartphone terminal.

Hardware configurations of the service providing device 10 and the smartphone terminal 30 according to the embodiment will be described with reference to FIG. 2. FIG. 2 is a diagram illustrating an example of a hardware configuration of the service providing device 10 and the smartphone terminal 30. Since the service providing device 10 and the smartphone terminal 30 have substantially the same hardware configuration, the hardware configuration of the service providing device 10 will be mainly described below.

As illustrated in FIG. 2, the service providing device 10 according to the embodiment includes an input device 101, a display device 102, an external I/F 103, a communication I/F 104, a read only memory (ROM) 105, a random access memory (RAM) 106, a central processing unit (CPU) 107, and an auxiliary storage device 108. The above hardware is communicatably connected via a bus 109.

The input device 101 is, for example, a keyboard, a mouse, or a touch panel, and is used when a user inputs various operations. The display device 102 is, for example, a display, and displays processing results of the service providing device 10. The service providing device 10 may not include at least one of the input device 101 and the display device 102.

The external I/F 103 is an interface with an external device. The external device includes a storage medium 103a or the like. The service providing device 10 can perform reading or writing of the storage medium 103a or the like via the external I/F 103.

The storage medium 103a includes, for example, a flexible disk, a compact disc (CD), a digital versatile disk (DVD), a secure digital memory card (SD memory card), or a universal serial bus (USB) memory card.

The communication I/F 104 is an interface for connecting the service providing device 10 to a network. The service providing device 10 can communicate with another service providing device 10, the in-vehicle device 40, or the like via the communication I/F 104. The communication I/F 104 of the smartphone terminal 30 includes a short-range wireless communication module (for example, Bluetooth module) for communicating with the in-vehicle device 40 through short-range wireless communication such as Bluetooth.

The ROM 105 is a nonvolatile semiconductor memory capable of holding programs or data even when the power is turned off. The ROM 105 is, for example, a nonvolatile semiconductor memory in which an operating system (OS) setting, a network setting, or the like is stored. The RAM 106 is a volatile semiconductor memory that temporarily holds programs or data.

The CPU 107 is an arithmetic device that reads programs or data from the ROM 105, the auxiliary storage device 108, and the like onto the RAM 106 and executes a process.

The auxiliary storage device 108 is, for example, a hard disk drive (HDD) or a solid state drive (SSD), and is a nonvolatile storage device that stores programs or data. The programs or data stored in the auxiliary storage device 108 include, for example, an OS, or application programs for realizing various functions on the OS.

The service providing device 10 and the smartphone terminal 30 according to the embodiment can realize various processes to be described below by having the hardware configuration illustrated in FIG. 2.

In-Vehicle Device 40

Figure 3:
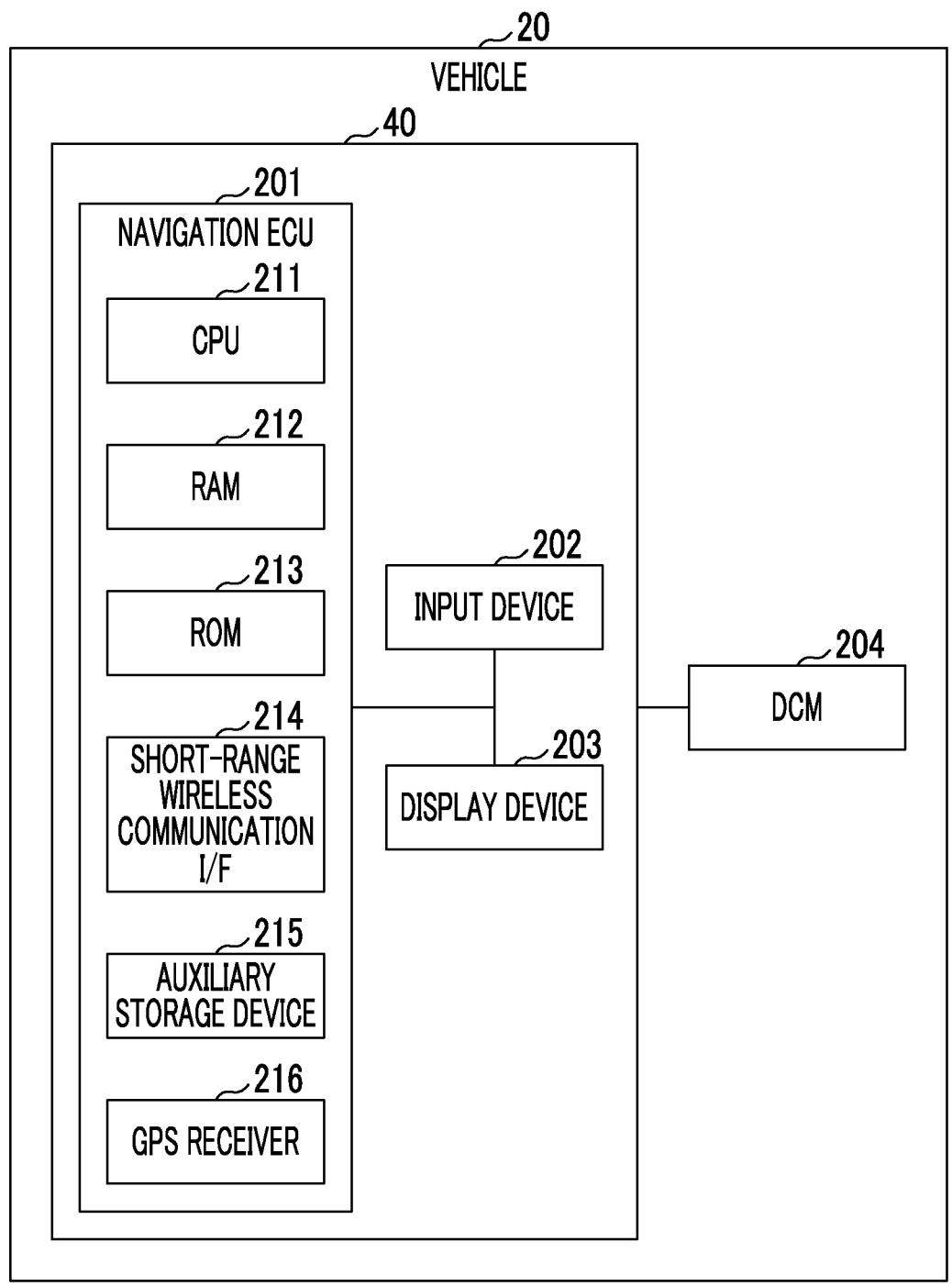
FIG. 3 is a diagram illustrating an example of a hardware configuration of an in-vehicle device.

A hardware configuration of the in-vehicle device 40 according to the embodiment will be described with reference to FIG. 3. FIG. 3 is a diagram illustrating an example of the hardware configuration of the in-vehicle device 40.

As illustrated in FIG. 3, the in-vehicle device 40 according to the embodiment includes a navigation electronic control unit (ECU) 201, an input device 202, and a display device 203. The in-vehicle device 40 according to the embodiment is connected to a data communication module (DCM) 204.

The navigation ECU 201 is an ECU that is disposed inside a navigation system mounted on the vehicle 20 and performs control of the navigation system. The navigation ECU 201 includes a CPU 211, a RAM 212, a ROM 213, a short-range wireless communication I/F 214, an auxiliary storage device 215, and a global positioning system (GPS) receiver 216.

The CPU 211 is an arithmetic device that reads programs or data from the ROM 213, the auxiliary storage device 215, or the like onto the RAM 212 and executes a process. The RAM 212 is a volatile semiconductor memory that temporarily holds programs or data.

The ROM 213 is a nonvolatile semiconductor memory capable of holding programs or data even when power is turned off. The short-range wireless communication I/F 214 is a short-range wireless communication module for communicating with the smartphone terminal 30 through short-range wireless communication such as Bluetooth.

The auxiliary storage device 215 is, for example, an HDD or an SSD, and is a nonvolatile storage device that stores programs or data. The GPS receiver 216 receives radio waves from a GPS satellite and measures a current position of the vehicle 20.

The input device 202 is, for example, a touch panel or various buttons, and is used when the user inputs various operations. The display device 203 is, for example, a display, and displays processing results of the in-vehicle device 40.

The DCM 204 is a wireless communication device that performs wireless communication according to communication standards such as 3G, 4G, LTE, or 5G. The navigation ECU 201 can communicate with the service providing device 10 via the DCM 204.

The in-vehicle device 40 according to the embodiment can realize various processes to be described below by having the hardware configuration illustrated in FIG. 3.

Overview of Process of Service Providing System 1

Figure 4:
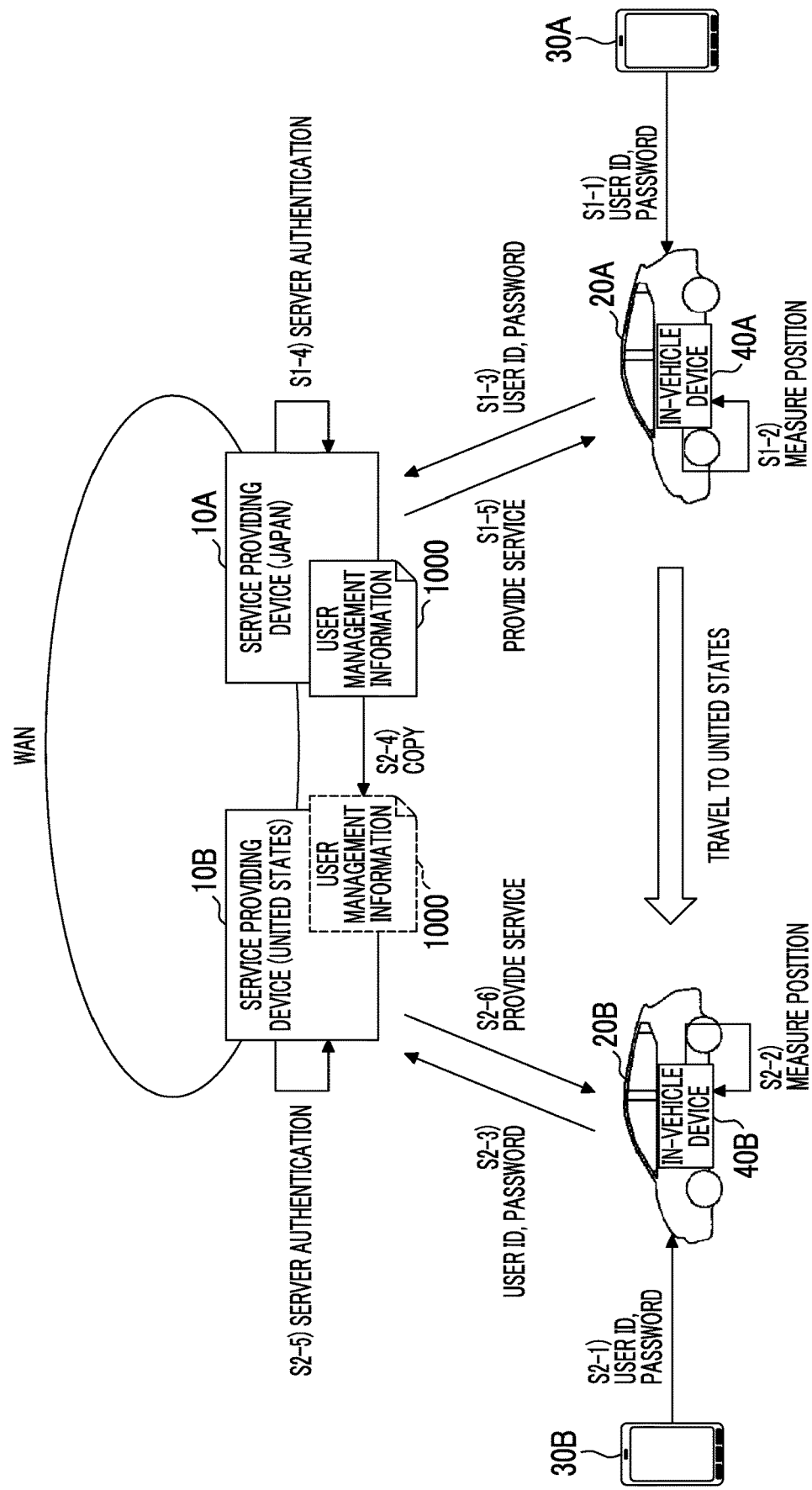
FIG. 4 is a diagram illustrating an example of an overview of a process of the service providing system.

The overview of the process of the service providing system 1 according to the embodiment will be described with reference to FIG. 4. FIG. 4 is a diagram illustrating an example of the overview of the process of the service providing system 1. In FIG. 4, a case where a user using a service in a vehicle 20A within Japan uses the service in a vehicle 20B using the same user ID in a destination in the United States will be described by way of example.

S1-1) When the user uses the service in the vehicle 20A within Japan, the user inputs a user ID and a password for using the service using the smartphone terminal 30A. The smartphone terminal 30A transmits the input user ID and password to an in-vehicle device 40A of the vehicle 20A.

S1-2) When the in-vehicle device 40A receives the user ID and the password from the smartphone terminal 30A, the in-vehicle device 40A measures a position of the vehicle 20A.

S1-3) The in-vehicle device 40A transmits the user ID and the password to the service providing device 10 (that is, the service providing device 10A within Japan) according to the measured position of the vehicle.

S1-4) The service providing device 10A performs server authentication using the received user ID and password and the user management information 1000 stored in a predetermined storage area. The user management information 1000 is information including a password corresponding to the user ID.

S1-5) When the server authentication has been successful, the service providing device 10A provides a predetermined service to the in-vehicle device 40. As described above, the user can use the service that is provided by the service providing device 10A.

S2-1) Here, when the user travels to the United States and uses the service in the vehicle 20B within the United States, the user inputs the user ID and the password for using the service by using the smartphone terminal 30B. The smartphone terminal 30B transmits the input user ID and password to the in-vehicle device 40B of the vehicle 20B.

The vehicle 20B, the smartphone terminal 30B, and the in-vehicle device 40B may be the same as the vehicle 20A, the smartphone terminal 30A, and the in-vehicle device 40A, respectively. The vehicle 20B is not limited to a vehicle purchased by the user within the United States, and may be, for example, a rental car borrowed in the United States.

S2-2) When the in-vehicle device 40B receives the user ID and the password from the smartphone terminal 30B, the in-vehicle device 40B measures the position of the vehicle 20B.

S2-3) The in-vehicle device 40B transmits the user ID and the password to the service providing device 10 (that is, the service providing device 10B within the United States) according to the measured position of the vehicle.

S2-4) When the user management information 1000 corresponding to the received user ID is not stored in the predetermined storage area, the service providing device 10B acquires (copies) the user management information 1000 from the service providing device 10 in which the user management information 1000 is stored, over a network such as a wide area network (WAN). That is, the service providing device 10B copies the user management information 1000 from the service providing device 10A.

S2-5) The service providing device 10B performs server authentication using the received user ID and password and the user management information 1000 copied from the service providing device 10A.

S2-6) When the server authentication has been successful, the service providing device 10B provides a predetermined service to the in-vehicle device 40. As described above, the user can use the service that is provided by the service providing device 10B.

As described above, in the service providing system 1 according to the embodiment, when the service providing device 10 corresponding to the location after the movement of the user does not have the user management information 1000 due to, for example, the movement of the location of the user, the user management information 1000 is acquired (copied) from another service providing device 10. As described above, the user can use a service according to a country or a region at which the user is, using the same user ID anywhere in each country or each region, for example.

According to the example in FIG. 4, the user management information is copied such that service is available in United States.

Functional Configuration

Figure 5:
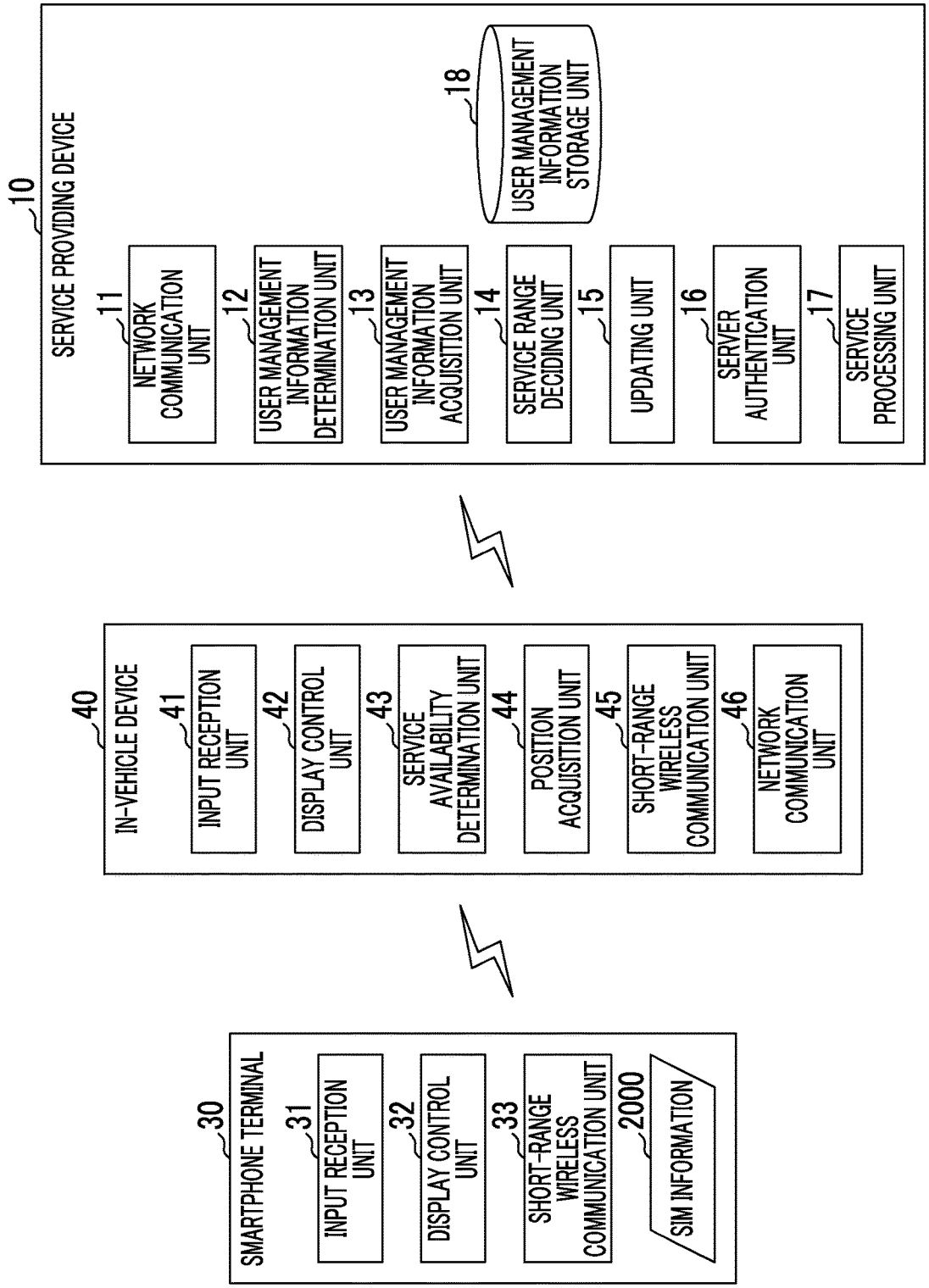
FIG. 5 is a diagram illustrating an example of a functional configuration of the service providing system according to the embodiment.

A functional configuration of the service providing system 1 according to the embodiment will be described with reference to FIG. 5. FIG. 5 is a diagram illustrating an example of the functional configuration of the service providing system 1 according to the embodiment.

As illustrated in FIG. 5, the smartphone terminal 30 according to the embodiment includes an input reception unit 31, a display control unit 32, and a short-range wireless communication unit 33. Each of the functional units is realized through processes that one or more programs installed in the smartphone terminal 30 cause the CPU 107 to execute.

The smartphone terminal 30 according to the embodiment includes subscriber identity module (SIM) information 2000. The SIM information 2000 is recorded in a SIM card mounted on the smartphone terminal 30.

The input reception unit 31 receives various inputs from the user. The input reception unit 31 receives an input of a user ID and a password from the user.

The display control unit 32 displays various screens. For example, the display control unit 32 displays a screen on which the user inputs a user ID and a password. For example, the display control unit 32 may display a screen of a service (for example, a screen on which traffic information is displayed) that is provided by the service providing device 10.

The short-range wireless communication unit 33 performs short-range wireless communication using Bluetooth or the like with the in-vehicle device 40. The short-range wireless communication unit 33 transmits the user ID and the password of which the input has been received by the input reception unit 31, and the SIM information 2000 to the in-vehicle device 40. The SIM information 2000 is information that includes a unique identification number of the smartphone terminal 30, a validity period of the SIM, and the like.

It is not indispensable to transmit the SIM information 2000 to the service providing device 10. However, by transmitting the SIM information 2000 to the service providing device 10, the in-vehicle device 40 can determine the availability of the service according to a validity period of the smartphone terminal 30, as described below.

As illustrated in FIG. 5, the in-vehicle device 40 according to the embodiment includes an input reception unit 41, a display control unit 42, a service availability determination unit 43, a position acquisition unit 44, a short-range wireless communication unit 45, and a network communication unit 46. The respective functional units are realized through processes that one or more programs installed in the in-vehicle device 40 cause the CPU 211 to execute.

The input reception unit 41 receives various inputs from the user. For example, when the user inputs the user ID and the password to the in-vehicle device 40, the input reception unit 41 receives the input of the user ID and the password.

The display control unit 42 displays various screens. For example, the display control unit 42 displays a screen of a service that is provided by the service providing device 10. When the user inputs the user ID and the password to the in-vehicle device 40, the display control unit 42 may display a screen for inputting the user ID and the password.

When the SIM information 2000 is received from the smartphone terminal 30, the service availability determination unit 43 determines whether or not the service is available, for example, according to the validity date included in the SIM information 2000. For example, when the validity period is shorter than a predetermined period, the service availability determination unit 43 determines that the service is not available. This case may be, for example, a case where the user is using a prepaid smartphone terminal 30 for a short-term stay such as an overseas trip. By preventing the use of the service of the user who is having the short-term stay as described above, it is possible to prevent a situation in which the number of the user management information 1000 to be copied between the service providing devices 10 increases.

The position acquisition unit 44 measures the position of the vehicle 20 using the GPS receiver 216 to acquire position information indicating the measured position of the vehicle.

The short-range wireless communication unit 45 performs short-range wireless communication using Bluetooth or the like with the smartphone terminal 30. The short-range wireless communication unit 45 receives the user ID, the password, and the SIM information 2000 from the smartphone terminal 30.

The network communication unit 46 performs communication using LTE or the like with the service providing device 10 via the DCM 204. The network communication unit 46 transmits the user ID and the password to the service providing device 10.

As illustrated in FIG. 5, the service providing device 10 according to the embodiment includes a network communication unit 11, a user management information determination unit 12, a user management information acquisition unit 13, a service range deciding unit 14, an updating unit 15, a server authentication unit 16, and a service processing unit 17. The respective functional units are realized through processes that one or more programs installed in the service providing device 10 cause the CPU 107 to execute.

The service providing device 10 according to the embodiment includes a user management information storage unit 18. The user management information storage unit 18 can be realized by using, for example, the auxiliary storage device 108. The user management information storage unit 18 is an example of a storage unit.

The network communication unit 11 performs communication using LTE or the like with the in-vehicle device 40. The network communication unit 11 receives the user ID and the password from the in-vehicle device 40. The network communication unit 11 is an example of a reception unit.

The network communication unit 11 communicates with another service providing device 10 via a network such as a WAN.

The user management information determination unit 12 determines whether or not the user management information 1000 corresponding to the user ID received by the network communication unit 11 is stored in the user management information storage unit 18. The user management information determination unit 12 is an example of a determination unit.

The user management information acquisition unit 13 acquires the user management information 1000. That is, when the user management information determination unit 12 determines that the user management information 1000 is stored in the user management information storage unit 18, the user management information acquisition unit 13 acquires the user management information 1000 from the user management information storage unit 18. On the other hand, when the user management information determination unit 12 determines that the user management information 1000 is not stored in the user management information storage unit 18, the user management information acquisition unit 13 transmits a request for acquisition of the user management information to the other service providing devices 10. As described above, when the user management information 1000 is not stored in the user management information storage unit 18 of the service providing device 10, the service providing device 10 can acquire the user management information 1000 from another service providing device 10. The user management information acquisition unit 13 is an example of an acquisition unit.

When the user management information 1000 related to the request for acquisition of the user management information is stored in the user management information acquisition unit 13, the service range deciding unit 14 decides a range of a service to be provided to the user based on the user management information 1000. The service range deciding unit 14 is an example of a deciding unit.

The updating unit 15 updates a movement history of the user management information 1000 when the user management information 1000 is transmitted to the other service providing device 10 in response to a request from the other service providing device 10. The movement history is a history indicating that the user management information 1000 has been copied to the other service providing device 10, as will be described below.

The server authentication unit 16 performs server authentication for authenticating a subject who uses a service based on the user ID and the password received by the network communication unit 11 and the user management information 1000 acquired by the user management information acquisition unit 13. The server authentication unit 16 is an example of an authentication unit.

When the authentication by the server authentication unit 16 has been successful, the service processing unit 17 provides a service according to the location of the vehicle 20 to the in-vehicle device 40. In this case, the service processing unit 17 provides the user with the service in the range decided by the service range deciding unit 14. The service processing unit 17 is an example of a providing unit.

The user management information storage unit 18 stores the user management information 1000. Here, the user management information storage unit 18 will be described with reference to FIG. 6. FIG. 6 is a diagram illustrating an example of the user management information storage unit 18.

As illustrated in FIG. 6, one or more pieces of user management information 1000 are stored in the user management information storage unit 18. The user management information 1000 includes, as data items, a user ID, a password, a movement history, an update date and time, and the like.

The user ID and the password are information needed for the user to use the service. The movement history is information indicating a history in which the user management information 1000 has been moved (copied) to another service providing device 10. The update date and time is information indicating a date and time when the movement history has been updated.

For example, it is assumed that a server ID indicating the service providing device 10A is "server A" and a server ID indicating the service providing device 10B is "server B". In this case, it is shown that the user management information 1000 corresponding to the user ID "user 001" has been created by the service providing device 10A at the update date and time "date and time 1", and then, has not yet been copied to another service providing device 10. On the other hand, it is shown that the user management information 1000 corresponding to the user ID "user 001" has been copied from the service providing device 10A to the service providing device 10B at an update date and time "date and time 3".

As described above, the user management information storage unit 18 stores the user management information 1000 including data items such as a user ID, a password, a movement history, and an update date and time. The user management information 1000 may include various data items, in addition to the above data items. For example, the user management information 1000 may include data items such as information on attributes of the user, information on services used by the user, information on the vehicle 20 driven by the user, and setting information of an application program for using the service.

Details of Process

Details of the process of the service providing system 1 according to the embodiment will be described. Hereinafter, a process in which the user uses the service that is provided by the service providing device 10 will be described with reference to FIG. 7. FIG. 7 is a sequence diagram illustrating an example of an overall process for using a service.

The short-range wireless communication unit 33 of the smartphone terminal 30 and the short-range wireless communication unit 45 of the in-vehicle device 40 perform Bluetooth connection authentication (step S101). With successful connection authentication, the smartphone terminal 30 and the in-vehicle device 40 are paired with Bluetooth. For example, the user brings the smartphone terminal 30 into the vehicle 20, turns on at least an ACC power supply of the vehicle 20, and performs a pairing start operation with the in-vehicle device 40, thereby starting the connection authentication.

The input reception unit 31 of the smartphone terminal 30 receives an input of a user ID and a password from the user (step S102). The user can input the user ID and the password on a predetermined screen displayed by the display control unit 32.

When the input of the user ID and the password is received by the input reception unit 31, the short-range wireless communication unit 33 of the smartphone terminal 30 transmits a server authentication request to the in-vehicle device 40 (step S103). The server authentication request includes the user ID and the password input by the user, and the SIM information 2000.

When the user ID and the password are stored in a predetermined storage area of the smartphone terminal 30 in advance, the short-range wireless communication unit 33 may transmit a server authentication request including the user ID and the password to the in-vehicle device 40.

The user may input the user ID and the password using the in-vehicle device 40. In this case, the input reception unit 41 of the in-vehicle device 40 receives the input of the user ID and the password. The user can input the user ID and the password on the predetermined screen displayed by the display control unit 42 of the in-vehicle device 40.

When the short-range wireless communication unit 45 receives the server authentication request, the service availability determination unit 43 of the in-vehicle device 40 determines whether or not the service is available according to the validity date of the SIM information 2000 included in the server authentication request (step S104).

For example, when the validity period is shorter than the predetermined period, the service availability determination unit 43 determines that the service is not available. On the other hand, when the validity period is equal to or longer than the predetermined period, the service availability determination unit 43 determines that the service is available.

When the service availability determination unit 43 determines in step S104 that the service is not available, step S105 to be described below is executed. On the other hand, when the service availability determination unit 43 determines in step S104 that the service is available, step S106 and subsequent steps to be described below are executed.

When the service availability determination unit 43 determines that the service is not available, the short-range wireless communication unit 45 of the in-vehicle device 40 transmits a response indicating that the server authentication is not performed to the smartphone terminal 30 (step S105). In this case, the user cannot use the service that is provided by the service providing device 10.

When the service availability determination unit 43 determines that the service is available, the position acquisition unit 44 of the in-vehicle device 40 measures the position of the vehicle 20 using the GPS receiver 216 and acquires position information indicating the measured position of the vehicle (step S106).

The network communication unit 46 of the in-vehicle device 40 transmits the server authentication request to the service providing device 10 corresponding to the position indicated by the position information acquired by the position acquisition unit 44 among the service providing devices 10 (step S107). The server authentication request includes a user ID and a password. Hereinafter, the description will be continued on the assumption that the network communication unit 46 has transmitted the server authentication request to the service providing device 10B installed in the United States.

The service providing device 10 corresponding to the position indicated by the position information is, for example, the service providing device 10 that provides the service of a country or a region in which the position is included. However, the service providing device 10 corresponding to the position indicated by the position information may be the service providing device 10 installed at a position closest to the above position.

The user management information determination unit 12 of the service providing device 10B determines whether or not the user management information 1000 corresponding to the user ID included in the server authentication request received by the network communication unit 11 is stored in the user management information storage unit 18 (step S108).

When the user management information determination unit 12 determines in step S108 that the user management information 1000 is not stored in the user management information storage unit 18, steps S109 to S112 to be described below are executed. On the other hand, when the user management information determination unit 12 determines in step S108 that the user management information 1000 is stored in the user management information storage unit 18, step S114 to be described below is executed.

When the user management information determination unit 12 determines in step S108 that the user management information 1000 is not stored in the user management information storage unit 18, the network communication unit 11 of the service providing device 10B transmits the request for acquisition of user management information to another service providing device 10 (step S109). The request for acquisition of the user management information includes the user ID.

The network communication unit 11 of the service providing device 10B may transmit the request for acquisition of user management information to all other service providing devices 10 all at once or may transmit the request for acquisition of user management information, for example, in the order of proximity of positions.

Subsequent processes in steps S110 to S112 are executed by the other service providing device 10 in which the user management information 1000 is stored in the user management information storage unit 18. In the embodiment, it is assumed that the user management information 1000 is stored in the user management information storage unit 18 of the service providing device 10A.

In this case, the service range deciding unit 14 of the service providing device 10A decides the range of the service to be provided to the user based on the user management information 1000 stored in the user management information acquisition unit 13 (step S110).

For example, when a determination is made that the user stays long term in the United States based on the user management information 1000, the service range deciding unit 14 sets the range of the service to be provided to the user as an "entire range". On the other hand, for example, when a determination is made that the user stays medium term in the United States based on the user management information 1000, the service range deciding unit 14 partially limits the range of the service to be provided to the user.

A period in which the user stays can be estimated from history information and the update date and time included in the user management information 1000. For example, when the history information included in the user management information 1000 is updated about every three years, it can be inferred that the user will stay for about three years this time, as well.

The service range decided by the service range deciding unit 14 may be written to the user management information 1000 in step S111 to be described below or may be notified together with the user management information 1000 in step S112 to be described below.

Step S110 may be performed by the service range deciding unit 14 of the service providing device 10B, for example, after step S112 to be described below.

The updating unit 15 of the service providing device 10A updates the movement history and the update date and time included in the user management information 1000 (step S111). That is, the updating unit 15 adds "server B" indicating the service providing device 10B that is a copy destination to the movement history included in the user management information 1000, and updates the update date and time corresponding to the movement history with a current date and time.

The network communication unit 11 of the service providing device 10A transmits the user management information 1000 updated by the updating unit 15 to the service providing device 10B (step S112). As described above, the service providing device 10B can acquire the user management information 1000 from another service providing device 10.

When the user management information 1000 is received from the other service providing device 10, the user management information acquisition unit 13 of the service providing device 10B stores the user management information 1000 in the user management information storage unit 18 (step S113). As described above, the user management information 1000 managed by the service providing device 10A is also copied to the service providing device 10B.

On the other hand, when the user management information determination unit 12 determines in step S108 that the user management information 1000 is stored in the user management information storage unit 18, the user management information acquisition unit 13 of the service providing device 10B acquires the user management information 1000 from the user management information storage unit 18 (step S114).

The server authentication unit 16 of the service providing device 10B performs server authentication for authenticating a subject who uses the service based on the user ID and the password received from the in-vehicle device 40 and the user management information 1000 acquired in step S112 or step S114 (step S115). That is, the server authentication unit 16 determines whether or not the user ID and the password match the user ID and the password included in the user management information 1000.

When the server authentication has failed in step S115, steps S116 and S117 to be described below are executed. On the other hand, when the server authentication has been successful in step S115, step S118 to be described below is executed.

When the server authentication has failed in step S115, the network communication unit 11 of the service providing device 10B transmits a response indicating that the server authentication has failed to the in-vehicle device 40 (step S116).

When the network communication unit 46 receives the response, the short-range wireless communication unit 45 of the in-vehicle device 40 transmits the response indicating that the server authentication has failed to the smartphone terminal 30 (step S117). In this case, the user cannot use the service that is provided by the service providing device 10B.

On the other hand, when the server authentication has been successful in step S115, the service processing unit 17 of the service providing device 10B performs a process of providing a predetermined service to the in-vehicle device 40 (step S118). As described above, for example, in the in-vehicle device 40, the display control unit 42 displays a service use screen. The user can use various services such as confirmation of traffic information and car navigation by operating start of use of a desired service from the service use screen. The service processing unit 17 may provide a predetermined service to the smartphone terminal 30 via the in-vehicle device 40.

CONCLUSION

As described above, in the service providing system 1 according to the embodiment, when the service providing device 10 that provides the service according to the location of the user does not manage the user management information 1000 corresponding to the user ID and the like received from the in-vehicle device 40, the service providing device 10 acquires the user management information 1000 from another service providing device 10. As described above, the user can use the service that is provided by the service providing device 10 for the location at which the user is, using the same user ID at different locations.

The present disclosure is not limited to the specifically disclosed embodiments, and various modifications and changes can be made without departing from the scope of the claims.

What is claimed is:

1. A service providing device configured to provide a service according to a position of a vehicle in cooperation with an in-vehicle device mounted on the vehicle, the service providing device comprising:

a storage unit configured to store driver management information including at least driver identification information for identifying a driver;

a reception unit configured to receive driver identification information of the driver of the vehicle from the in-vehicle device;

a determination unit configured to determine whether the driver management information including the driver identification information received by the reception unit is stored in the storage unit;

an acquisition unit configured to acquire the driver management information from one or more other service providing devices connected to the service providing device over a network when the determination unit determines that the driver management information is not stored in the storage unit;

an authentication unit configured to authenticate the in-vehicle device based on the driver management information acquired by the acquisition unit;

a providing unit configured to provide the service to the in-vehicle device when the authentication by the authentication unit has been successful, and a deciding unit configured to decide a range of the service to be provided to the in-vehicle device from the acquisition history included in the driver management information acquired by the acquisition unit, wherein the storage unit configured to further store the driver management information including an acquisition history in which the driver management information has been obtained from another service providing device by the acquisition unit, the providing unit configured to provide the service in the range decided by the deciding unit, and the deciding unit configured to estimate a period during which the service is to be providable based on the acquisition history included in the driver management information, and to limit the range narrower as the period is shorter, wherein the service including a service for assisting driving of the vehicle and services other than the service for assisting driving of the vehicle, and wherein deciding unit configured to limit, based on a term for staying, the range of the service to be provided.

2. The service providing device according to claim 1, wherein the reception unit is configured to receive driver identification information input by a terminal connected to the in-vehicle device through short-range wireless communication or driver identification information input in the in-vehicle device from the in-vehicle device.

3. The service providing device according to claim 2, wherein:

the storage unit is configured to further_store the_driver management information including at least driver identification information for identifying the driver and authentication information corresponding to the driver identification information;

the reception unit is configured to receive authentication information input by the terminal or authentication information input in the in-vehicle device from the in-vehicle device; and the authentication unit is configured to authenticate the in-vehicle device based on the authentication information included in the driver management information acquired by the acquisition unit and the authentication information received by the reception unit.

4. A service providing system comprising:
an in-vehicle device mounted on a vehicle; and a plurality of service providing devices configured to provide a service according to a position of the vehicle in cooperation with the in-vehicle device, wherein:

the in-vehicle device is configured to
- receive an input of driver identification information for identifying a driver of the vehicle,
- measure the position of the vehicle, and
- transmit the driver identification information of which the input has been received to the service providing device according to the measured position of the vehicle among the service providing devices; and the service providing devices are configured to
- store driver management information including at least driver identification information for identifying the driver,
- receive the driver identification information of the driver of the vehicle from the in-vehicle device,
- determine whether the driver management information including the received driver identification information is stored,
- acquire the driver management information from one or more other service providing devices different from the service providing device among the service providing devices when a determination is made that the driver management information is not stored,
- authenticate the in-vehicle device based on the acquired driver management information,
- provide the service to the in-vehicle device when the authentication has been successful,
- decide a range of the service to be provided to the in-vehicle device from the acquisition history included in the driver management information acquired by the acquisition unit,
- store the driver management information including an acquisition history in which the driver management information has been obtained from another service providing device by the acquisition unit,
- provide the service in the range decided by the deciding unit, and
- estimate a period during which the service is to be providable based on the acquisition history included in the driver management information, and to limit the range narrower as the period is shorter, wherein the service including a service for assisting driving of the vehicle and services other than the service for assisting driving of the vehicle, and wherein deciding unit configured to limit, based on a term for staying, the range of the service to be providable.

5. The service providing system according to claim 4, wherein the in-vehicle device is configured to perform short-range wireless communication with a terminal, and transmit the input driver identification information for identifying the driver of the vehicle or driver identification information received from the terminal to the service providing device.

6. The service providing system according to claim 5, wherein the service providing device is configured to
- further store the driver management information including at least driver identification information for identifying the driver and authentication information corresponding to the driver identification information,
- receive authentication information input by the terminal or authentication information input in the in-vehicle device from the in-vehicle device, and
- authenticate the in-vehicle device based on the authentication information included in the acquired driver management information and the authentication information received from the in-vehicle device.

7. The service providing device according to claim 1, wherein the service providing device is configured to provide the service according to a location in which the position of the vehicle is located, and the period during which the service is to be providable includes a period during which the user stays in the location.

8. The service providing system according to claim 4, wherein the service providing device is configured to provide the service according to a location in which the position of the vehicle is located, and the period during which the service is to be providable includes a period during which the user stays in the location.

* * * * *